INVENTOR.
ALLAN E. BJERKE

May 23, 1950            A. E. BJERKE            2,508,351
CASTER CENTERING DEVICE

Filed July 27, 1946                                        2 Sheets-Sheet 2

*INVENTOR.*
ALLAN E. BJERKE
BY
*Kwis, Hudson, Boughton & Williams*
ATTORNEYS

Patented May 23, 1950

2,508,351

UNITED STATES PATENT OFFICE 2,508,351

CASTER CENTERING DEVICE

Allan E. Bjerke, Maple Heights, Ohio, assignor to The Cleveland Pneumatic Tool Company, Cleveland, Ohio, a corporation of Ohio Application July 27, 1946, Serial No. 686,778

4 Claims. (Cl. 244—103)

This invention relates to improvements in caster centering devices, primarily devices for use in airplane landing gear to bring the nose wheel or tail wheel of the landing gear into parallelism with the fuselage of the plane while the plane is still in the air, so that upon landing such caster wheel will be disposed in alignment with the direction of flight and will present minimum resistance upon contacting the ground.

It is conventional practice to damp out oscillations of such a caster wheel during travel of the plane upon the ground, such damping means functioning ordinarily to present hydraulic resistance to deflection of the caster wheel. In some centering devices heretofore employed in which the centering mechanism is independent of the oscillation damper, the force employed to center the wheel is in constant operation while the plane is on the ground as well as while it is in the air. In such cases it is necessary, when turning the caster wheel for steering the plane on the ground, to overcome the resistance of the oscillation damper and the resistance of the centering device as well. Other devices for centering the caster wheel employ a mechanism within the shock absorber that will force the wheel into proper alignment when the shock absorber is extended, but which becomes inoperative when the shock absorber strut is compressed under the load of the plane, in other words during taxiing. The latter devices, while not subject to the objection of increasing the steering effort, are relatively expensive to manufacture.

One of the objects of the present invention therefore is the provision of a centering device for caster wheels which shall be separate from the shock absorber and yet one which shall present no resistance to steering of the plane on the ground.

Another object is the provision of such a device which shall be of simple inexpensive construction.

Another object is the provision in such a device of an actuator which shall be responsive to the elongation or extension of the shock absorber strut, so that whenever the plane is off the ground and the load upon the shock absorber is removed the centering device will be effective.

Other objects and features of novelty will appear as I proceed with the description of that embodiment of the invention which, for the purposes of the present application, I have illustrated in the accompanying drawings, in which Fig. 1 is a side elevation partly in vertical section, of a shock absorber provided with a caster wheel mounting and a centering device embodying the invention, the shock absorber being under load.

Figure 1:
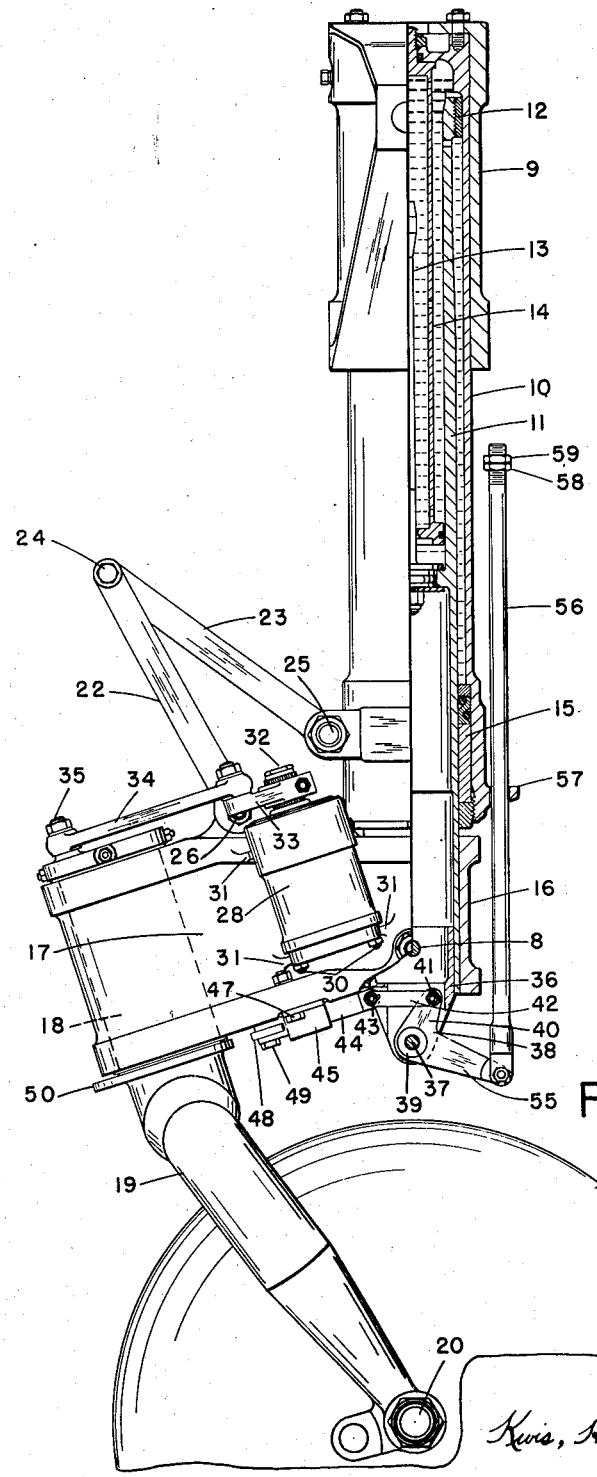

In the drawing I have illustrated the invention in conjunction with a hydropneumatic shock absorber of more or less conventional construction embodying an outer upper telescoping member 10 and an inner lower telescoping member 11. The construction may include a piston head 12 at the upper end of member 11, a metering pin 13 carried by member 11 extending slidably through an opening at the lower end of a tubular part 14 secured to the upper end of telescoping member 10, and a bearing ring 15 carried at the lower end of member 10 and constituting a guide for the inner telescoping member 11. The telescoping member 10 is surmounted by a bracket 9 which constitutes means for attaching the shock absorber to the fuselage of a plane. The details of this portion of the device may be varied considerably without departing from the invention.

Telescoping member 11 is appreciably longer than member 10, and when the shock absorber is compressed or under load the lower end of member 11 projects beneath the lower end of member 10, as indicated in Fig. 1. This projecting lower end portion of member 11 is surrounded by a cylindrical collar 16 which is fixed to member 11 by a crossbolt 8. Collar 16 forms a part of housing 17, in the opposite end of which there is an inclined bearing for a spindle 18 which constitutes part of a caster wheel bracket 19. The latter carries an axle 20 on which is journaled a ground wheel 21. Steering of the plane on the ground may be effected by turning the bracket 19 in one direction or the other.

Suitable means is provided for preventing relative rotation of the two telescoping members 10 and 11, and this means preferably takes the form of a pair of torque arms 22 and 23 which are pivotally joined at 24, the arm 23 being pivotally connected at 25 with the upper outer telescoping member 10 and the arm 22 being pivotally connected at 26 with the housing 17.

The invention comprises means, which may be of conventional character, for damping oscillations of the caster wheel such as tend to result from obstructions on the ground encountered by the wheel 21, and the shimmy or vibration which in some cases is set up because of such wheel deflection. As illustrated herein I employ a drum or cylinder 28 having spaced laterally extending plates 29 that are secured by bolts 30 to ears 31 integral with the housing 17. Cylinder 28 is the casing of a rotary shock absorber which comprises vanes mounted on a shaft 32 working in liquid within the casing. A crank 33 is clamped to shaft 32 and is pivotally connected at its outer end to a link 34 that is pivotally mounted upon a stud 35 extending upwardly in an eccentric position from the spindle 18. Any sudden rotational movement of the spindle is thus communicated to the shaft 32 which, because of the internal construction of the damping device, tends to oppose such rotation.

Mounted interiorly of the telescoping member 11 at the lower extremity thereof is a bracket 36, the bolt 8 extending through this bracket as well as through collar 16. Bracket 36 at its lower end carries a pivot bolt 37 upon which is mounted a bell crank lever 38 having lateral hub portions 39 to provide good bearing surface and eliminate wobble. The shorter arm 40 of this lever is pivotally connected at 41 with a link 42, and the latter is pivotally connected at 43 with a slide 44.

Figure 4:
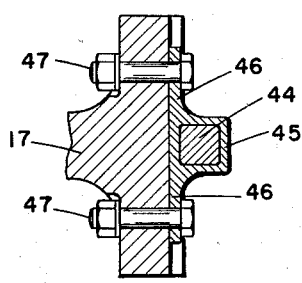
Fig. 4 is a detail sectional view taken substantially on the line 4—4 of Fig. 3.

Slide 44 is preferably square in cross-section as shown in Fig. 4, and runs through a correspondingly shaped guide 45 which has side flanges 46 that are secured to the bottom of the housing 17 by bolts 47 or the like. Slide 44 and guide 45 are disposed in the plane which extends through the axes of the shock absorber and the spindle 18. At its free end slide 44 carries a roller follower 48 adapted to turn about a stud 49 in the slide. Follower 48 is in the same plane with a collar 50 which is fixed to spindle 18 and on its side toward the shock absorber is formed with a recess 51 the sides of which have symmetrical cam surfaces 52. The cam portion of this collar will be hereinafter referred to as heart shaped. When the recess 51 is in alignment with the slide 44 and the follower 48 the bracket 19 is so disposed that the wheel 21 stands parallel to the fuselage of the plane.

The longer arm 55 of bell crank lever 38 is pivotally connected to the lower extremity of an actuating rod 56 which is disposed alongside and parallel to the shock absorber. This rod is slidably guided in an eye 57 formed integral with the lower end of telescoping member 10. A stop nut 58 is threadably mounted on the upper end of rod 56, backed by a lock nut 59. Nut 58 is adapted to contact eye 57 when the shock absorber is extended, and by this means a pull is exerted on rod 56 which is converted into counterclockwise movement of bell crank 38 and movement of link 42 and slide 44 to the left as viewed in the drawings.

Figure 3:
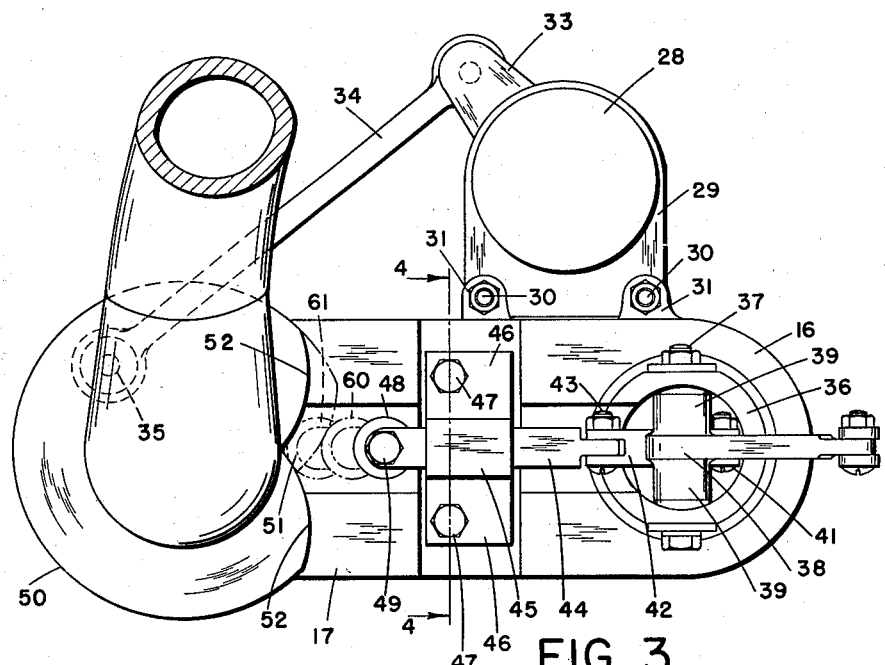
Fig. 3 is a bottom plan view corresponding to Fig. 1 but on a larger scale.

*Operation.*—When the plane is standing on the ground or being taxied over the ground, the shock absorber is under load and assumes the position illustrated in Fig. 1. At such times the weight of actuating rod 56 holds the bell crank 38, link 42 and slide 44 in the positions of those parts illustrated in Fig. 1. At this time the follower 48 is withdrawn from any possible contact with collar 50, as indicated in full lines in Fig. 3, and the wheel centering device offers no obstacle whatever to movement of the caster wheel, particularly movement imparted thereto for the purpose of steering the plane in its travel over the ground.

Figure 2:
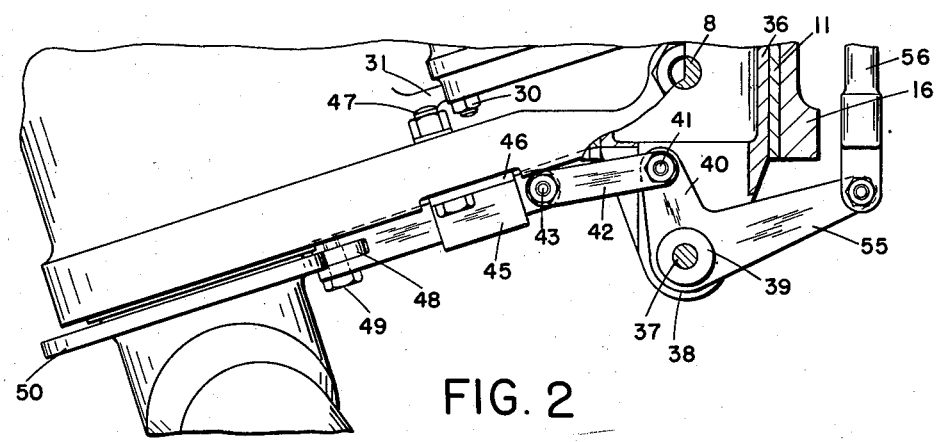
Fig. 2 is a fragmental detail view on a larger scale showing the centering device in operative position, which it assumes when the shock absorber is not under load, in other words when the plane is in the air.

Now when a flight is started and the plane takes off the telescoping member 10 of the shock absorber rises, the member 11 tending to remain down due to gravity and to the air pressure within the shock absorber. As soon as this relative movement between the telescoping members proceeds far enough eye 57 will engage nut 58 on rod 56 and will exert a pull on the rod which will shift the lever and link mechanism from the position of Fig. 1 to that of Fig. 2. This will advance the roller follower 48 into engagement with one or both of the cam surfaces 52. In case the caster wheel is deflected somewhat when it leaves the ground the follower 48 may contact one only of the cam surfaces 52, as indicated by the position marked 60 in Fig. 3. In this position the compressed air within the shock absorber will exert pressure through the follower 48 on this cam surface, and will turn the collar 50 counterclockwise as viewed in Fig. 3, the follower 48 following the turning collar until the follower assumes the position marked 61 and the recess 51 lines up with the plane of the axes of the shock absorber and the spindle 18. The caster wheel is thereby brought into parallelism with the fuselage of the plane, and it will remain in that position until a landing is made when the follower will again be withdrawn and the centering mechanism will be rendered ineffective so long as the plane remains on the ground.

Having thus described my invention, I claim:

1. In a caster wheel construction for airplane landing gear, a shock absorber comprising upper and lower telescoping members and containing compressed air acting to expand the shock absorber when not under load, a caster wheel carried by the lower member, wheel centering means also carried by said lower member including mechanical connections adapted to be moved into operative position to center said caster wheel and to be withdrawn therefrom into inoperative position, an actuating rod disposed parallel with said telescoping members connected at its lower end with said mechanical connections and biased through gravity toward withdrawal of said centering means from operative position, said rod having stop means adapted to be engaged by said upper member for moving the rod relative to said lower member against its bias and actuating said mechanical connections toward operative position as said members approach a predetermined degree of extension.

2. In a caster wheel construction for airplane landing gear, a shock absorber comprising upper and lower telescoping members and containing compressed air acting to expand the shock absorber when not under load, a caster wheel carried by the lower member, wheel centering means also carried by said lower member, and actuating means responsive to the relative downward movement of the lower telescoping member effective to operate said centering means as the shock absorber approaches a predetermined degree of extension, said actuating means comprising a rod disposed parallel to said telescoping members, connected at its lower end with said centering means, said upper member having an eye through which said rod extends slidably, and a nut threaded on said rod adapted to engage said eye.

3. In a caster wheel construction for airplane landing gear, a shock absorber comprising upper and lower telescoping members and containing compressed air acting to expand the shock absorber when not under load, a housing fixed to the lower telescoping member, torque arms for preventing relative rotation of said telescoping members, a caster wheel bracket having an upstanding spindle rotatably mounted in said housing, rotation snubbing means carried by said housing and extending to said bracket for retarding its rotation relative to said housing, centering means also carried by said housing operatively associated with said bracket, and actuating means for said centering means operatively associated with said telescoping cylinders and responsive to their movement in one direction to disable said centering means.

4. In a caster wheel construction for airplane landing gear, a shock absorber comprising upper and lower telescoping members and containing compressed air acting to expand the shock absorber when not under load, a caster wheel carried by the lower member, wheel centering means also carried by said lower member, and actuating means responsive to the downward movement of the lower relative to the upper telescoping member effective to operate said centering means as the shock absorber approaches a predetermined degree of expansion, said actuating means comprising a rod disposed parallel to said telescoping members, connected at its lower end with said centering means, and stop means on said rod and upper member engaging and holding said rod fixed with respect to said upper member before said shock absorber reaches a predetermined degree of expansion.

ALLAN E. BJERKE.

REFERENCES CITED

The following references are of record in the file of this patent:

UNITED STATES PATENTS

| Number | Name | Date |
| --- | --- | --- |
| 2,132,682 | Dowty | Oct. 11, 1938 |
| 2,291,518 | Wells | July 28, 1942 |
| 2,339,877 | Pullin | Jan. 25, 1944 |
| 2,424,233 | Greenough | July 22, 1947 |

FOREIGN PATENTS

| Number | Country | Date |
| --- | --- | --- |
| 308,244 | Italy | May 30, 1933 |
| 519,275 | Great Britain | Mar. 20, 1940 |
| 549,773 | Great Britain | Dec. 7, 1942 |